INVENTOR,
Edward F. Canfield
by Semmes & Semmes
ATTORNEYS ing # United States Patent Office 3,316,949
Patented May 2, 1967

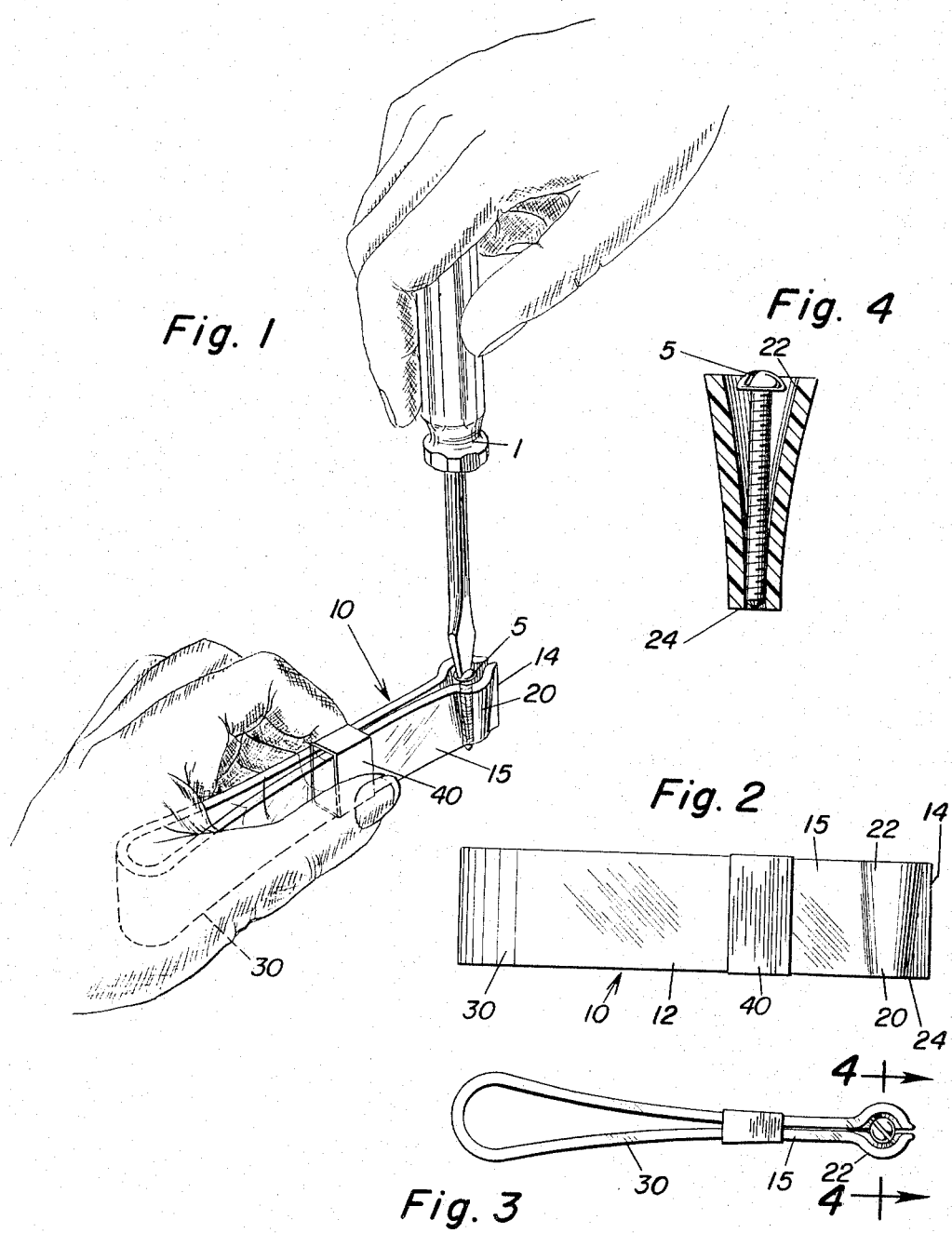

3,316,949
POSITIONING TOOLS
Edward F. Canfield, 9705 Kendale Road,
Potomac, Md. 20854
Filed June 24, 1965, Ser. No. 466,774
5 Claims. (Cl. 145—46)

This invention concerns tools for precisely positioning a fastener or other apparatus with respect to another object. Although intended primarily for use with screws, this tool is useful for accurately positioning other fasteners as well as bits and drills and other operating tools.

Difficulties in positioning fasteners and drills accurately with respect to work pieces has in the past necessitated punching and pilot drilling. Placing screws and drills at desired angles is particularly difficult. Several nail holders and screw holders for use in conjunction with hammer screw drivers have been devised. Patented devices are exemplified by: Hibbard et al. Patent 2,985,208, issued May 23, 1961, and Dahlquist Patent 2,191,010, issued Feb. 20, 1940.

Known apparatus have important disadvantages of inaccuracy, instability, difficulty in starting screws or bits, and cumbersome operations, as well as lack of simplicity. The present invention overcomes drawbacks of old devices, by providing a stable positioning tool, which is transparent and sufficiently rigid for accuracy, and which provides for adequate grasping of the tool and for stability on a work piece surface. Elements of this tool provide ease of operation. A screw may be dropped into the tool and immediately may be turned with a screw driver. When an operation has proceeded sufficiently to assure correct alignment, the positioning tool may be removed without disengaging screw and screw driver, drill and work piece, or other operating elements.

Accordingly, it is an object of this invention to provide positioning tools for positioning apparatus with respect to surfaces.

Another objective of this invention is the provision of a positioning tool for accurately locating a tool or fastener on a work piece surface.

This invention has as a third object the providing of a positioning tool for precisely angularly orienting a tool or fastener with respect to a surface.

A further object of the invention is the providing of a positioning tool capable of easily receiving a fastener or tool and readily releasing a fastener or tool.

Another objective of this invention is disclosing construction of a rigid positioning tool from a plastic strip and an encircling band.

Further objects of the invention will be apparent from the drawings in which:

FIGURE 1 is a perspective view of a positioning tool used to position a screw precisely with respect to a work piece surface;

FIGURE 2 is a side elevation of the positioning tool;

FIGURE 3 is a plan view of the positioning tool, in which the head of a screw is visible;

FIGURE 4 is a sectional detail of the conical holder portion of the tool, taken along lines 4—4 of FIGURE 3;

Figure 5:
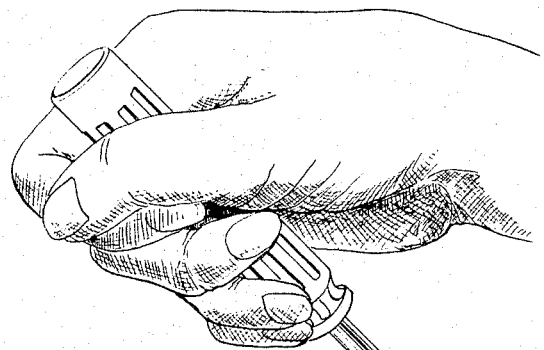
FIGURE 5 is a perspective view of a positioning tool having a holder cone at a 45° angle to the tool's base.

Referring to the drawings, in FIGURE 1 a positioning tool is generally indicated by numeral 10. For purposes of illustration, tool 10 is shown constructed of a single strip of Teflon or a tough, transparent polyvinyl plastic. A medial portion of the strip has been reversedly bent to form handle 30; juxtaposed intermediate portions of the strip form shank 15. Opposite ends of the strip have been heat formed as truncated semi cones; together, they form holder cone 20. Cone 20, shank 15 and handle 30 are made of a single piece of plastic. A band or clamp 40 holds the shank walls and sections of the cone together.

As best seen in FIGURE 2, base 12 of tool 10 forms a substantially flat surface, which is useful for steadying the tool on a work piece surface. The wide portion of handle 30 adds lateral stability to base 12 of the tool. Upright 14 is preferably constructed at right angles to edge 12, so that edge 14 may be useful in assisting alignment. In operation screw 5 is simply dropped in wide portion 22 of cone 20 so that the tip of the screw points toward constricted end 24 of the cone. Without benefit of center punching or pilot drilling, a screw may be positioned precisely over a chosen point and turned in with screw driver 1. After screw 5 has been started sufficiently, the positioning tool may be removed from the screw and screw driver, without separating screw and screw driver, simply by moving the tool to the left as shown in FIGURES 2 and 3, and by releasing the screw and screw driver through open edges 14.

Figure 6:
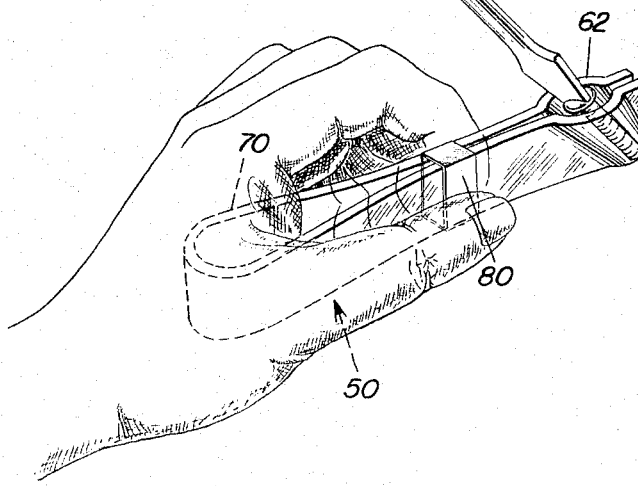
FIGURE 6 is a side elevation of the tool shown in FIGURE 5, with a screw inserted in the holder cone.
Figure 7:
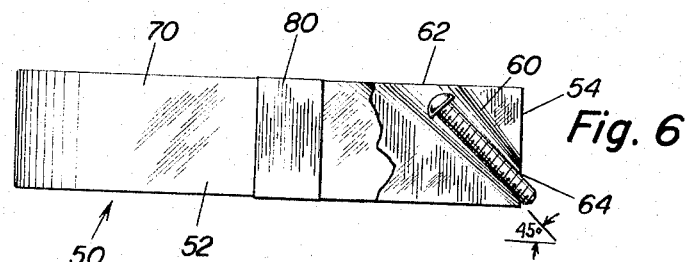
FIGURE 7 is a plan view of the tool shown in FIGURES 5 and 6.

In FIGURES 5 through 7, cone 60 is oriented at a 45° angle to base 52 of positioning tool 50. Alternatively, cone 60 may be oriented at any desired angle relative to base 50. Wide portion 62 of cone 60 is located relatively close to band 80 and handle 70. Convergent opening 64 may be located at the extreme corner of tool 50 to facilitate placing screws or drills in corners of work pieces. Base 52 as augmented by the lower edge of relatively wide handle 70 comprises a flat surface for stabilizing the tool with respect to a work piece. Additionally, edge 54 may be used to augment stabilization in corners. Edge 54 is open to allow withdrawal of the positioning tool while drill or screw driver is engaged.

In operation, positioning tool 10 or positioning tool 50 may be placed with the convergent opening directly over the desired position for a screw or hole. Screw 5 is dropped into divergent opening 62 or 22 while holding the tool fixed with respect to the surface. A screw driver advances the screw, and as it becomes stable in the work piece, the positioning tool may be withdrawn by sliding it along the surface, allowing the screw driver and screw to emerge from the opening in edge 14 or 54 of the tool. Accurate positioning is insured by complete visibility of the screw and of the work surface.

Although this invention has been described by specific embodiment, it will be obvious to one skilled in the art that other applications may be made without departing from the scope of the invention. Accordingly, the invention is precisely limited only in the appended claims.

I claim:

1. A positioning tool comprising:
an elongated plastic strip having a medial portion and integral opposite end portions, said medial portion being reversedly bent, thereby forming a handle, said opposite end portions respectively defining opposite truncated semi cones aligned adjacent each other, thereby forming a conical holder, and means holding juxtaposed opposite extremities of said medial portion juxtaposed.

2. The apparatus of claim 1 wherein said conical holder defines a lateral opening opposite said shank.

3. The apparatus of claim 1 wherein said strip further comprises a flat base.

4. The apparatus of claim 3 wherein said remote ends collectively define a cone having an axis transverse a longitudinal dimension of said strip and parallel to said strip.

5. A positioning tool comprising:
(A) an elongated plastic strip comprising a handle, a medial portion extending into integral opposite end portions urgable towards each other, said opposite end portions respectively defining opposite truncated semi-cones aligned adjacent each other so as to form a conical holder; and (B) means holding juxtaposed opposite extremities of said medial portion juxtaposed.

References Cited by the Examiner

UNITED STATES PATENTS 1,016,383  2/1912  Wellman _____ 145—1.2
2,878,476  3/1959  Auchard _____ 145—1
3,060,442  10/1962  Tomek _____ 145—46

References Cited by the Applicant

UNITED STATES PATENTS 2,191,010  2/1940  Dahlquist.
2,985,208  5/1961  Hibbard.

WILLIAM FELDMAN, *Primary Examiner.*

R. V. PARKER, *Assistant Examiner.*